(No Model.)
T. R. FISCHER.
TEA OR COFFEE POT.
No. 501,648. Patented July 18, 1893.
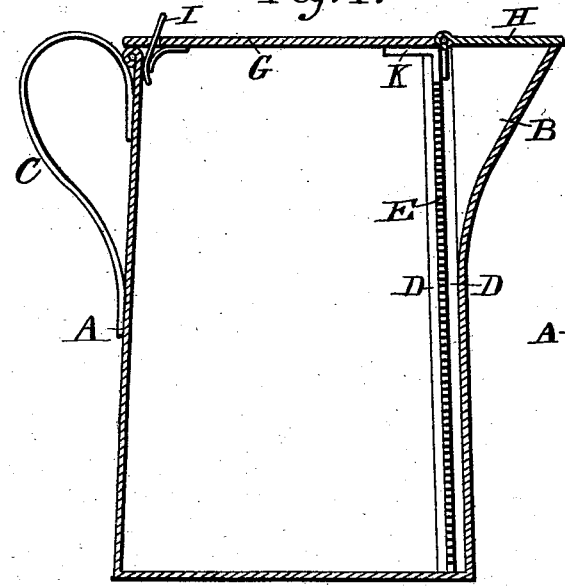
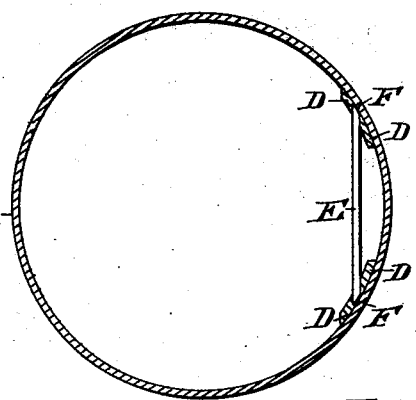
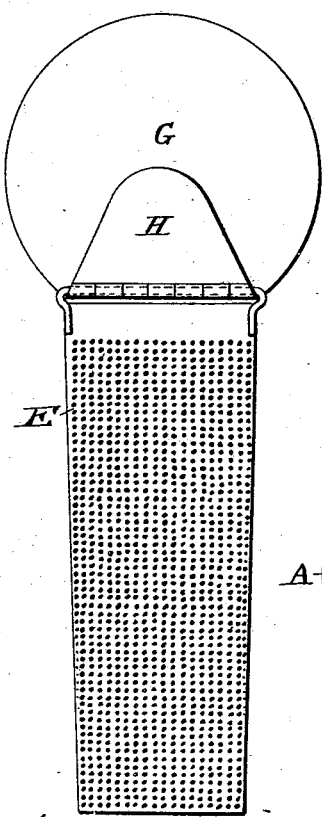
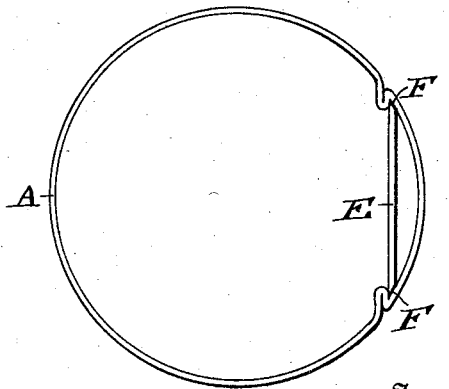
Witnesses
R. F. Heck
Chas. W. Blackwood
Inventor
Therese R. Fischer
by Blackwood Bros.
Attorneys

United States Patent Office.

THERESE R. FISCHER, OF BALTIMORE, MARYLAND.

TEA OR COFFEE POT.

SPECIFICATION forming part of Letters Patent No. 501,648, dated July 18, 1893.

Application filed April 1, 1893. Serial No. 468,628. (No model.)

*To all whom it may concern:*

Be it known that I, THERESE R. FISCHER, a citizen of the United States of America, residing at Baltimore, Maryland, have invented a new and useful Improvement in Tea or Coffee Pots; and I do hereby declare the following to be a full, clear, and exact description of the invention, such as will enable others skilled in the art to which it appertains to make and use the same.

My invention relates to improvements in pots, more especially to that class known as coffee or tea pots.

Heretofore more or less trouble has been experienced in thoroughly cleaning pots which have their covers hinged, and their strainers stationary. The object of this invention is to obviate this difficulty by providing a pot having its lids hinged to a removable strainer, so that all can be easily and readily removed from the pot when it is desired to clean the same, by simply lifting off the lids.

My invention consists in the pot provided with guides or ways, the removable strainer located in said guides or ways, reaching from the top to the bottom of the pot, and the lids hinged to said strainer, one of the lids covering the body of the pot provided with a spring catch to secure it in a closed position.

In the accompanying drawings which illustrate my invention and in which like letters of reference denote like parts, Figure 1— is a central vertical sectional view of my improved pot; Fig. 2— a horizontal section; Fig. 3— a detail of the strainer and lids; Fig. 4— a modified form of the strainer, showing the top bent over; Fig. 5— a modification of the guides or ways.

In the drawings A represents the pot, B the spout, C the handle, D D the guide strips, E the strainer removably held in the groove or ways F, formed between said guide strips, and G and H the covers hinged together and attached to the upper end of the strainer by projecting the pivot pin of the hinge slightly outward on each side, then bending it down approximately at a right angle and soldering it securely to the strainer.

While the above means of attaching the cover and strainers together is preferable, other means might be employed.

I is a spring catch for keeping the cover G closed.

Referring to the modification shown in Fig. 4, the strainer is provided with a lip K at its top, the sides L, L, of which are curved to correspond to the inner contour of the pot, the object of this lip being to prevent the coffee or other liquid contained in the pot from overflowing or leaking out between the hinges, when the pot is tipped up in the operation of pouring the contents therefrom.

Referring to the modification shown in Fig. 5, the guides or ways are formed by indenting the sides of the pot, thereby doing away with the necessity for guide strips.

Having thus described my invention, what I claim, and desire to secure by Letters Patent, is—

In a coffee or tea pot, the removable strainer located therein having two lids hinged thereto, the upper end of said strainer provided with a lip to prevent the liquid from leaking out between the hinges, substantially as described.

In testimony whereof I affix my signature in presence of two witnesses.

THERESE R. FISCHER.

Witnesses:
GEO. L. HAMMERBACHER,
CHARLES F. EVANS.